US008286448B2

United States Patent
Kuz et al.

(10) Patent No.: US 8,286,448 B2
(45) Date of Patent: Oct. 16, 2012

(54) PROTECTED HOLLOW GLASSWARE TAKE-OUT DEVICE, IN PARTICULAR FOR A HOLLOW GLASSWARE MOLDING MACHINE

(75) Inventors: Zdenko Kuz, Steinhausen (CH); Gianclaudio Borsarelli, Cuneo (IT); Maurizio Barolo, Fossano (IT)

(73) Assignee: Bottero S.p.A., Cuneo (IT)

( * ) Notice: Subject to any disclaimer, the term of this patent is extended or adjusted under 35 U.S.C. 154(b) by 289 days.

(21) Appl. No.: 12/716,421

(22) Filed: Mar. 3, 2010

(65) Prior Publication Data
US 2010/0223958 A1 Sep. 9, 2010

(30) Foreign Application Priority Data

Mar. 3, 2009 (IT) .............................. TO2009A0162

(51) Int. Cl.
*C03B 9/447* (2006.01)
(52) U.S. Cl. ............ 65/260; 65/361; 414/733; 414/736; 414/738
(58) Field of Classification Search .................... 65/260, 65/239, 241, 361; 414/24, 568, 733, 736, 414/738
See application file for complete search history.

(56) References Cited

U.S. PATENT DOCUMENTS

| | | | | | |
|---|---|---|---|---|---|
| 1,835,579 | A | * | 12/1931 | Westin | 414/733 |
| 3,401,029 | A | * | 9/1968 | Roberts | 65/260 |
| 3,410,417 | A | * | 11/1968 | Fouse | 414/733 |
| 4,244,726 | A | * | 1/1981 | Northup | 65/264 |
| 4,298,373 | A | * | 11/1981 | Mumford et al. | 65/260 |
| 4,325,725 | A | * | 4/1982 | Fujimoto | 65/230 |
| 4,466,821 | A | * | 8/1984 | Irwin et al. | 65/307 |
| 4,494,973 | A | * | 1/1985 | Perry | 65/260 |
| 4,525,195 | A | * | 6/1985 | Foster | 65/260 |
| 7,024,887 | B2 | * | 4/2006 | Tijerina-Ramos et al. | 65/29.11 |

(Continued)

FOREIGN PATENT DOCUMENTS
EP 1842809 * 10/2007
(Continued)

OTHER PUBLICATIONS
Italian search report dated Nov. 17, 2009 from corresponding IT T020090162.

(Continued)

*Primary Examiner* — Matthew Daniels
*Assistant Examiner* — Yana Belyaev
(74) *Attorney, Agent, or Firm* — Ohlandt, Greeley, Ruggiero & Perle, L.L.P.

(57) ABSTRACT

A protected hollow glassware take-out device having a support equipped with drive means; a first arm fitted in rotary manner to and projecting from the support, and which is connected to and rotated by the drive means with respect to the support; a second arm, equipped with grippers, which is fitted in rotary manner to and projects from the first arm; and means for rotating the second arm synchronously with respect to the first, and in turn having a shaft, which is coaxial with a rotation member of the first arm, and is secured at one end to the support, and at the opposite end to the first arm; and a kinematic mechanism carried by the first arm and connecting the shaft to a rotation member of the second arm; controlled-yielding angular connecting means being located between the shaft and the support; and the rotation member of the first arm being connected to the first arm indirectly via torque transmission means with a predetermined break load.

11 Claims, 4 Drawing Sheets

U.S. PATENT DOCUMENTS

| | | | | |
|---|---|---|---|---|
| 2004/0050665 A1 | * | 3/2004 | Gerber et al. | 198/468.2 |
| 2006/0182604 A1 | * | 8/2006 | Clark et al. | 414/736 |
| 2006/0230789 A1 | * | 10/2006 | Lang | 65/260 |

FOREIGN PATENT DOCUMENTS

| | | | |
|---|---|---|---|
| GB | 2 182 297 A | | 5/1987 |
| GB | 2182297 A | * | 5/1987 |

OTHER PUBLICATIONS

Isalberti, G., "*Challenges in wide mouth container production/Les Defis de la Production de Receipients Large Ouverture*"; Verre, Institut Du Verre, Paris, France, vol. 11, No. 3, Jun. 1, 2005, pp. 27-28, XP001233515.

\* cited by examiner

PROTECTED HOLLOW GLASSWARE TAKE-OUT DEVICE, IN PARTICULAR FOR A HOLLOW GLASSWARE MOLDING MACHINE The present invention relates to a protected so-called take-out device for hollow glassware, in particular for a hollow glassware molding machine.

BACKGROUND OF THE INVENTION

A take-out device for glass bottle molding machines, to transfer semifinished products from the pre-mold to the finish mold and/or the finished product (bottle) from the molding machine to a conveyor line, is known, for example, from GB2182297, is normally supported by positioning means movable along three axes, and comprises a support with drive means; a first arm fitted in rotary manner to the support and rotated by the drive means; and a second arm hinged idly at an angle to the first and rotated synchronously with the first arm by a toothed belt-pulley mechanism housed inside the first arm and in turn operated by rotation of the first arm by means of a shaft coaxial with the first-arm rotation member, normally defined by a hollow shaft, but fitted immovably to the support. The end of the second arm fitted with the grippers thus keeps the bottles vertical at all times as the first arm rotates about a horizontal axis.

Though satisfactory, a device of the type described may be subject to accidental collision with other nearby devices on the molding machine, e.g. pushers, cooling heads, collar arms, etc., which normally operate in strict synchronization with the take-out arm and along frequently interfering paths, but which, for various reasons or improper adjustment, may sometimes drift out of sync and collide with the take-out device.

As a result, the component parts of the take-out device—especially the mechanism operating the second arm in sync with the first, and the drive means fitted to the support—may become damaged or at least be knocked out of sync, thus resulting in costly machine stoppages.

SUMMARY OF THE INVENTION

It is an object of the present invention to eliminate the above drawback of the known state of the art by providing a hollow glassware take-out device, in particular for a hollow glassware molding machine, designed to protect its major components from consequences of a collision, and which at the same time is compact, reliable, and easy and relatively cheap to produce.

According to the present invention, there is provided a protected hollow glassware take-out device, in particular for a hollow glassware molding machine, as claimed in the attached Claims.

More specifically, the device according to the invention comprises a support equipped with drive means; a first arm fitted in rotary manner to and projecting from the support, and which is connected to and rotated by the drive means with respect to the support; a second arm, equipped with grippers, which is fitted in rotary manner to and projects from the first arm; means for rotating the second arm synchronously with respect to the first, and in turn comprising a shaft, which is coaxial with a rotation member of the first arm, and is secured at one end to the support, and at the opposite end to the first arm; and a kinematic mechanism carried by the first arm and connecting the shaft to a rotation member of the second arm.

According to the main aspect of the invention, controlled-yielding angular connecting means are interposed between the shaft and the support.

Also, the rotation member of the first arm is connected to the first arm indirectly via torque transmission means with a predetermined break load.

According to a further aspect of the invention, the controlled-yielding angular connecting means comprise preloaded elastic means and preload control means comprising: a prismatic first end of the shaft, projecting axially from a through hole in the support, in which the shaft is mounted idly and in fluidtight manner, on the opposite side to the first arm; a lever secured angularly integral with and projecting radially from the first end of the shaft; a threaded rod, a first end of which is screwed transversely through a bushing fitted idly to a fork-shaped free end of the lever; a shoulder element of the support, through which extends a seat perpendicular to the axis of the shaft and through which seat the threaded rod is housed axially; and elastic means, which are fitted to a second end of the threaded rod, opposite the first end and projecting from the shoulder element on the side opposite to the bushing, and are packed between an end head on the second end of the rod and a surface of the shoulder element facing the end head.

Moreover, axial stop means are provided on the rod, on the opposite side to said surface of the shoulder element to cooperate with the supporting member, on the opposite side to the end head of the rod.

Any shock to the device is therefore not transmitted to the kinematic mechanism controlling synchronous movement of the second arm, on account of the preloaded elastic means allowing, and also absorbing, a small amount of rotation of the shaft which, being stationary, operates the mechanism as a consequence of the rotation of the first arm. The load allowing such rotation can be calibrated accurately and in such a manner it is high enough not to affect normal, i.e. shock-free, operation of the device, by normally keeping the shaft angularly stationary, as a matter of fact secured integrally to the support.

According to another aspect of the invention, the torque transmission means with a predetermined break load comprise: an adapter ring bolted frontally to the support and coaxial with the rotation member of the first arm, which comprises a hollow shaft fitted inside the support and rotated by the drive means; a sleeve bolted to and projecting from the first arm, perpendicularly to the laying plane of the first arm, and coaxial with the shaft, which is fitted idly inside the sleeve; and key means connecting the adapter ring angularly integral with the sleeve. The sleeve is inserted coaxially inside the hollow shaft, through the adapter ring.

The shaft operating the kinematic mechanism controlling synchronous operation of the second arm is thus protected by the sleeve, and, in the event of severe shock, stress can be prevented from being transmitted to and damaging the hollow shaft and the drive means fitted to the support, by designing the key means to break in the event of severe shock. In which case, the machine need only be stopped for a very short period to replace the key means and possibly also the adapter ring, if this is deformed.

BRIEF DESCRIPTION OF THE DRAWINGS

Further features and advantages of the present invention will be apparent from the following description of a preferred, non-limiting embodiment thereof given purely by way of example with reference to the accompanying drawings, in which.

DETAILED DESCRIPTION OF THE INVENTION

Figure 1:
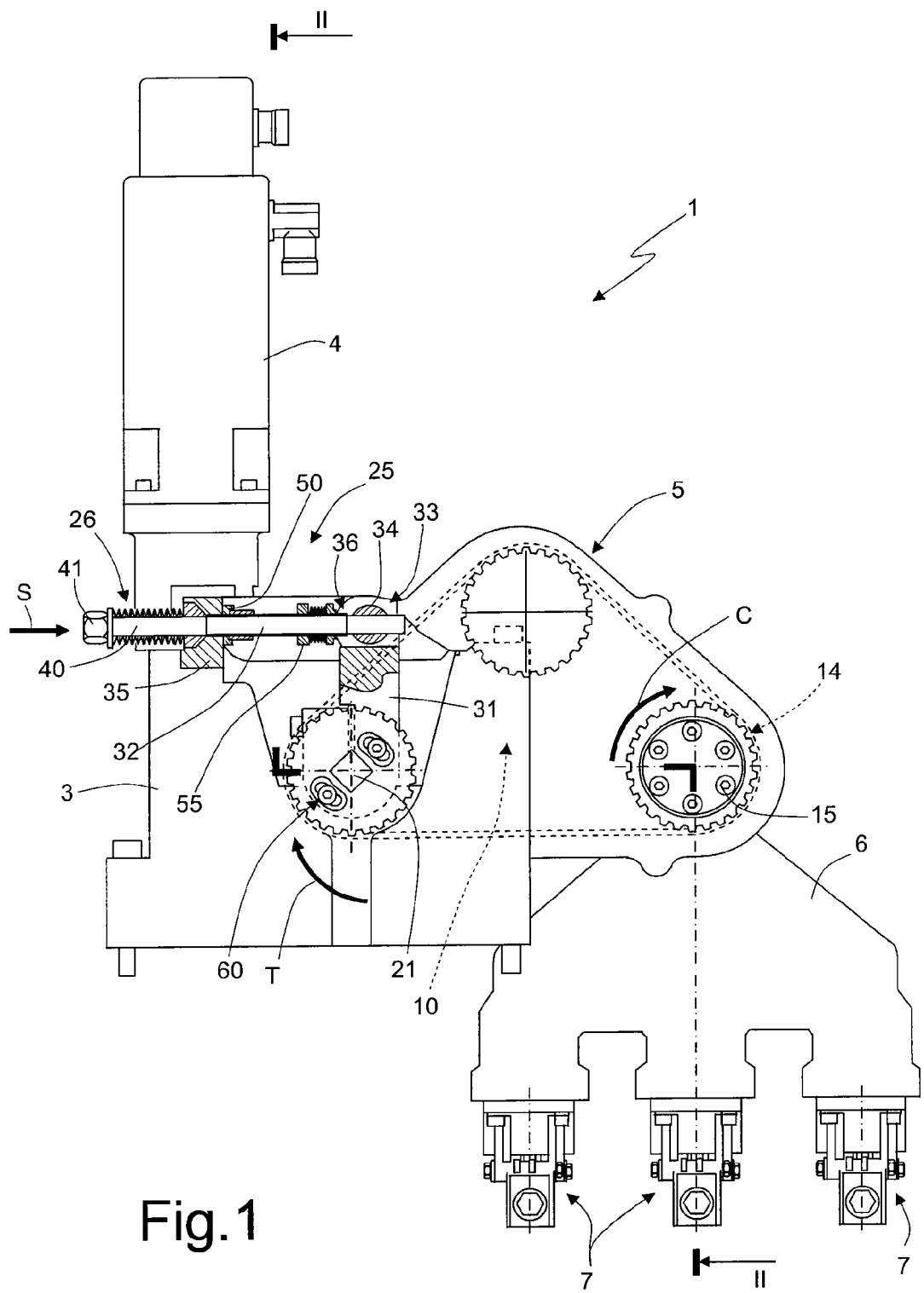
FIG. 1 shows an elevation view of a take-out device in accordance with the present invention, for a known hollow glassware molding machine, not shown.

With reference to FIGS. 1 to 5, number 1 indicates a protected take-out device for hollow glassware, e.g. bottles, and in particular for a known molding machine, not shown for the sake of simplicity.

Device 1, the overall design of which is known, comprises a support 3 or so-called gearbox, equipped with known drive means 4; a known first arm 5, which is fitted in rotary manner to and projects from support 3, is connected in known manner (not shown for the sake of simplicity) to drive means 4, and is rotated by drive means 4 with respect to support 3 about a horizontal axis A; and a second arm 6, which is equipped with known grippers 7, and is fitted in rotary manner to and projects from first arm 5.

Device 1 also comprises known means, indicated as a whole by 10, for rotating arm 6 synchronously with respect to arm 5, and which are housed mostly inside arm 5, and in turn comprise a shaft 11 (FIGS. 2, 3); and a kinematic mechanism 14 fitted to arm 5 and connecting shaft 11 to a member 15 for rotating arm 6 and also fitted to arm 5.

Shaft 11 is coaxial with a member 12 (FIGS. 2, 4) for rotating arm 5, and consisting in a hollow tubular shaft housed idly inside support 3 by means of bearings 13, and connected mechanically in known manner (not shown) to drive means 4.

Shaft 11 is connected at one end to support 3, and at the opposite end to arm 5. More specifically, one end (FIG. 2) is bolted to the body of arm 5, and the opposite end 21 is connected to support 3 as described below.

According to the main aspect of the invention, controlled-yielding angular connecting means 25 are located between end 21 of shaft 11 and support 3, to mechanically connect the former to the latter.

Figure 5:
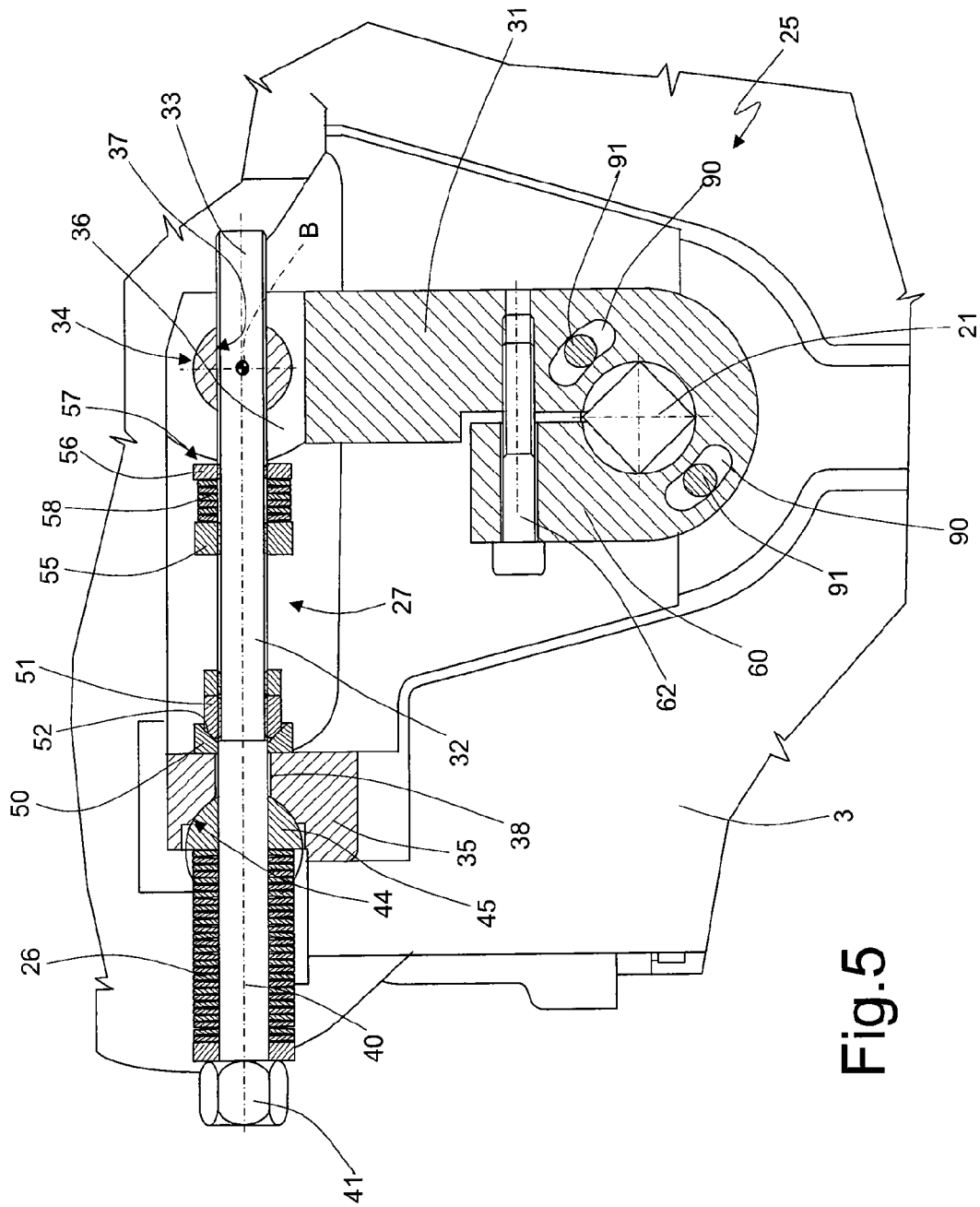
FIG. 5 shows a larger-scale, partly sectioned detail of the FIG. 1 device.

More specifically, connecting means 25 comprise preloaded elastic means 26; and preload control means indicated as a whole by 27 (FIG. 5).

In the preferred, non-limiting embodiment shown, controlled-yielding angular connecting means 25 comprise end 21 of shaft 11, which is prismatic; a lever 31 connected angularly integral with, and projecting radially from, end 21 of shaft 11; a threaded rod 32, a first end 33 of which is screwed transversely through a bushing 34 fitted idly to lever 31; a shoulder element 35 of support 3; and elastic means 26.

Figure 2:
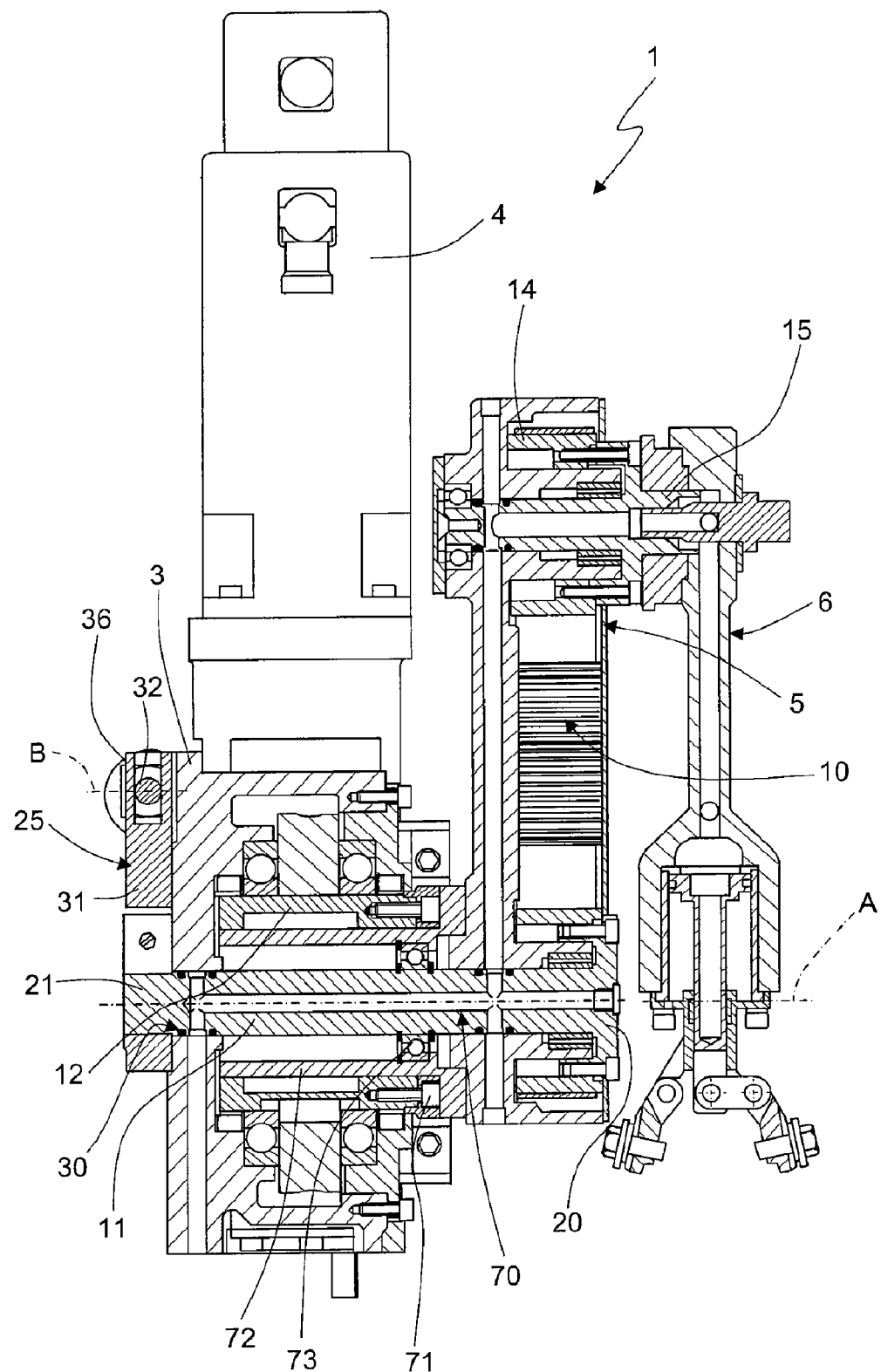
FIG. 2 shows a section along line II-II of the FIG. 1 device.
Figure 4:
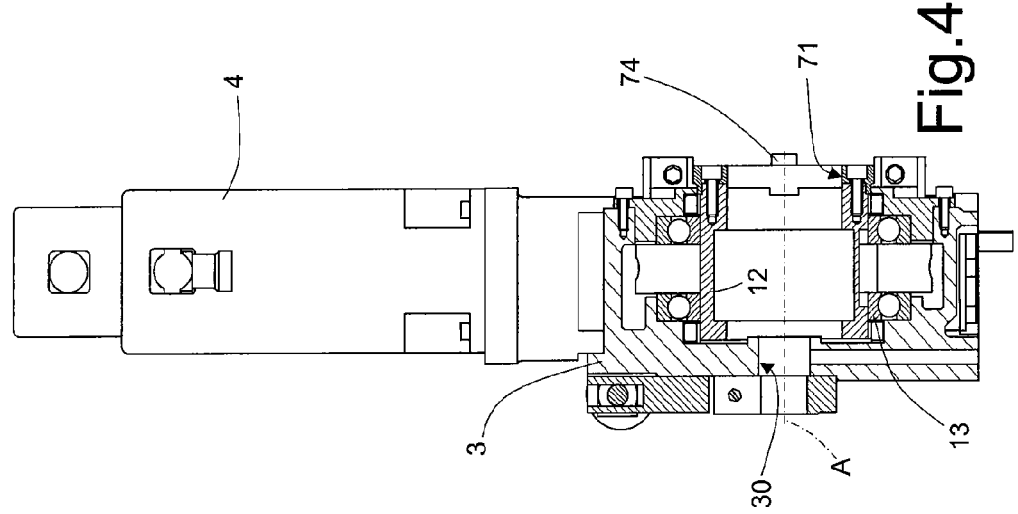
FIG. 4 shows a lateral section, as in FIG. 2 and with parts removed for clarity, of the device according to the invention.
Figure 3:
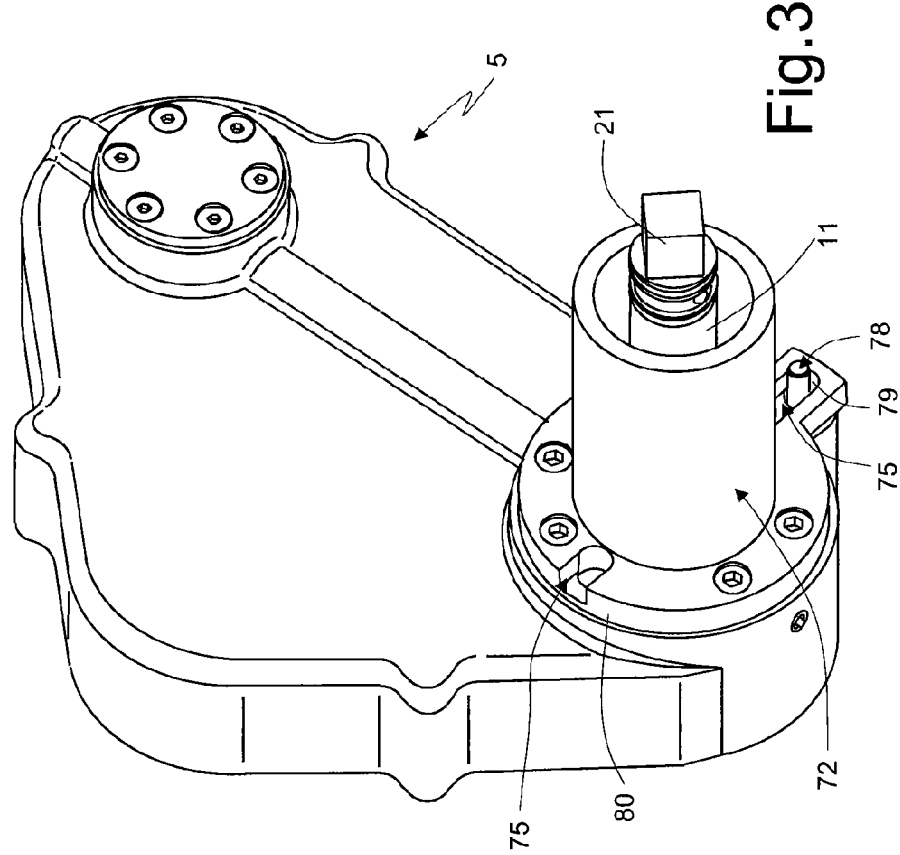
FIG. 3 shows a three-quarter rear isometric view of a main arm of the FIGS. 1 and 2 device.

More specifically, end 21 projects axially from a through hole 30 (FIG. 4) in support 3, in which shaft is fitted idly and in fluidtight manner, on the opposite side to arm 5 (FIG. 2). Bushing 34 is hinged—so as to rotate freely about its axis, perpendicular to rod 32—to a fork-shaped free end 36 of lever 31, and has a threaded transverse hole 37 in which end 33 may screw/unscrew.

A seat 38 (FIG. 5) extends through shoulder element 35 of support 3 to axially house in a through manner threaded rod 32; seat 38 is normally coaxial with hole 37 (when bushing 34 is not rotated), and is perpendicular to axis A, which coincides with both the axis of symmetry and rotation of shaft 11, and the axis of symmetry and rotation of hollow shaft 12.

Elastic means 26 are fitted to a smooth (i.e. threadless) second end 40 of threaded rod 32, opposite end 33 and projecting from shoulder element 35, on the opposite side to bushing 34, and are packed between a prismatic end head 41 on end 40 of rod 32, and a surface 44 (FIG. 5) of shoulder element 35 facing head 41.

In the example shown, elastic means 26 comprise a pack of disk springs packed tightly between surface 44 and end head 41 on end 40 of rod 32; and surface 44 is spherical and cooperates with the pack of disk springs defining elastic means 26 with the interposition of a washer 45, which has a spherical surface mating and cooperating with that of shoulder element 35, and is fitted in sliding manner to the smooth end 40 of threaded rod 32.

To complete the mechanism connecting rod 32 to supporting member 35, rod 32 is fitted with axial stop means located on the opposite side to surface 44 and comprising a washer 50, which also has a spherical surface 52, but facing the opposite way to surface 44; and a threaded bushing 51 screwed to threaded rod 32 and having a spherical surface which cooperates with surface 52 to lock washer 50 axially.

Subjected to the thrust of elastic means 26 preloaded between head 41 and surface 44 by appropriately screwing rod 32 inside bush 34, washer 50 cooperates with shoulder element 35 of support 3, on the opposite side to head 41 of rod 32, to prevent elastic means 26 from rotating lever 31, together with shaft 11, anticlockwise (FIG. 5). This "zero" position corresponds to the normal stationary operating position of shaft 11, and can be fine-adjusted by screwing or unscrewing bushing 51 on rod 32.

To avoid kickback in use, rod 32 is preferably fitted, close to end 33, with a flange 55 (FIG. 5) screwed to rod 32 and facing a washer 56 adjacent to a surface 57 of fork-shaped end 36 of lever 31; and second elastic means 58, also comprising a tight pack of disk springs, are packed tightly between flange 55 and washer to press washer 56 against surface 57, which is curved with a radius of curvature centred at an axis B of rotation of bushing 34.

The pack of elastic means 58 serves to take up any slack between surface 57 of lever 31 and the surface of washer 56, by keeping the surface of washer 56 pressed at all times against surface 57. This ensures immediate response when adjusting the angular position of arm 5 with respect to support 3, by unscrewing screw 62 and rotating lever 31 on prismatic end 21 of shaft 11. Surface 57 being curved, the pack of springs 58 is compressed uniformly, so the operator need only apply constant force (neither increasing nor decreasing) to centre the position of the arm.

At the opposite end to fork-shaped end 36, lever 31 has a U-shaped end 60 fitted to prismatic end 21 of shaft 11 and locked to it by screw 62 fitted transversely through U-shaped end 60 (FIG. 5).

According to a further aspect of the invention, the rotation member or hollow shaft 12 of arm 5 is connected to arm 5 indirectly via torque transmission means 70 (FIG. 2) with a predetermined break load.

More specifically, means 70 comprise an adapter ring 71 bolted to the front of the support and coaxial with hollow shaft 12 (FIG. 4); a sleeve 72 bolted to and projecting from arm 5, perpendicularly to the plane of arm 5, and coaxial with shaft 11, which is fitted idly inside sleeve 72 by means of a bearing 73; and key means 74, 75 (FIGS. 3, 4) connecting the front of adapter ring 71 angularly integral with sleeve 72.

Sleeve 72 (FIG. 2) is inserted coaxially inside hollow shaft 12 through adapter ring 71, and is locked axially and coaxially at the front against adapter ring 71 by at least one screw 78 parallel to hollow shaft 12 and fitted through a lug 79 on sleeve 72, close to one of the key slots 75 formed on the front of a mounting flange 80 of sleeve 72. Conversely, the front of adapter ring 71 has respective projecting, integral keys 74 (FIG. 4) formed in diametrically opposite positions, and only one of which is shown in the drawing.

In actual use, elastic means 26 hold washer 50 resting against element 35 rendering integral shaft 11 to support 3 by means of lever 31. So, when arm 5 is rotated by rotating hollow shaft 12, shaft 11 remains stationary, and mechanism 14 inside arm 5 rotates arm 6 synchronously by rotating shaft 15.

In the event of shock to arm 6, shaft 15 (and, therefore, mechanism 14) is subjected to a torque C (shown by the arrow in FIG. 1), which corresponds to torsional stress T (indicated by the arrow) on shaft 11, and, via lever 31, to axial stress S (indicated by the arrow in FIG. 1) on rod 32.

This stress further compresses the already preloaded elastic means 26, so that rod 32 moves towards arm 5; washer 50 detached from shoulder element 35; bushing 34 rotates about its axis B with respect to fork-shaped end 36; and lever 31, together with shaft 11, is rotated by and in the same direction as torsion T, which is damped by the resistance of elastic means 26, without any kickback being exerted on mechanism 14 or, worse still, being transmitted to shaft 12. Once the effect of the shock dies down, elastic means 26 restore the original situation. Any excessive angular movement of shaft 11 is prevented by curved slots 90 formed on end 60 of lever 31 and engaged by pins 91 integral with support 3.

In the event of shock to arm 5, the torque exerted on shaft 11 is absorbed by elastic means 26 in the same way as described above. Moreover, if stress is severe enough to damage shaft 12, kinematic mechanism 14 (this is the weakest and in fact the first to fail), and the mechanism drive gears fitted to support 3, it is prevented from being transmitted to shaft 12 by keys 74 breaking and angularly disconnecting sleeve 72 integral with arm 5, and adapter ring 71 integral with shaft 12. Operation of device 1 is restored quickly by replacing ring 71.

The invention claimed is:

1. A protected hollow glassware take-out device, comprising: a support equipped with drive means; a first arm fitted in rotary manner to and projecting from the support, and which is connected to and rotated by the drive means with respect to the support; a second arm, equipped with grippers, which is fitted in rotary manner to and projects from the first arm; and means for rotating the second arm synchronously with respect to the first arm comprising a shaft, which is coaxial with a sleeve and with a rotation member of the first arm, and is secured at one end to the support, and at the opposite end to the first arm; and a kinematic mechanism carried by the first arm and connecting the shaft to a rotation member of the second arm; and controlled-yielding angular connecting means are located between the shaft and the support.

2. The device as claimed in claim 1, wherein said controlled-yielding angular connecting means comprise preloaded elastic means and preload control means.

3. A device as claimed in claim 1, wherein said controlled-yielding angular connecting means comprise: a prismatic first end of said shaft, projecting axially from a through hole in the support, in which the shaft is fitted idly and in fluidtight manner, on the opposite side to the first arm; a lever connected angularly integral to and projecting radially from said first end of the shaft; a threaded rod, a first end of which is screwed transversely through a bushing fitted idly to a fork-shaped free end of the lever; a shoulder element of the support, through which a seat extends, perpendicularly to the axis of the shaft, and is fitted through with and axially houses the threaded rod; and elastic means, which are fitted to a second end of the threaded rod, opposite the first end and projecting from the shoulder element, on the opposite side to said bushing, and are packed between an end head on the second end of the threaded rod and a surface of the supporting member facing the end head; axial stop means being provided on the threaded rod, on the opposite side to said surface, and cooperating with the shoulder element of the support, on the opposite side to said end head of the threaded rod.

4. A device as claimed in claim 3, wherein said elastic means comprise a pack of disk springs packed tightly between said end head on the second end of the threaded rod, and said surface of the shoulder element facing the end head.

5. A device as claimed in claim 3, wherein said surface of the shoulder element facing the end head of the threaded rod is spherical; a washer being interposed between said elastic means and said spherical surface, having a spherical surface mating and cooperating with that of the shoulder element, and being fitted in sliding manner to the threaded rod.

6. A device as claimed in claim 3, wherein said threaded rod is fitted, close to said first end, with a flange screwed to the threaded rod and facing a second washer adjacent to a surface of the fork-shaped end of said lever; second elastic means being packed tightly between said flange and said second washer to press the second washer against the surface of the fork-shaped end.

7. A device as claimed in claim 6, wherein said surface of the fork-shaped end is a curved circular surface with a radius of curvature centered at an axis of rotation of the bushing, so that said second elastic means, defined by a pack of disk springs, are compressed uniformly at all times, thus enabling an operator to act on said first arm with constant force (neither increasing nor decreasing) to adjust the angular position of the first arm, and therefore of the second arm, with respect to the support.

8. A device as claimed in claim 3, wherein, at the end opposite the fork-shaped end, said lever has a U-shaped end fitted to the prismatic first end of the shaft and locked to it by a screw fitted transversely through the U-shaped end.

9. A device as claimed in claim 1, wherein, the rotation member of the first arm is connected to the first arm indirectly via torque transmission means with a predetermined break load.

10. A device as claimed in claim 9, wherein said torque transmission means with a predetermined break load comprise: an adapter ring bolted to the front of the support and coaxial with the rotation member of the first arm, which comprises a hollow shaft fitted inside the support and rotated by the drive means; the sleeve, which is bolted to and projects from the first arm, perpendicularly to the laying plane of the first arm, is coaxial with said shaft fitted idly inside the sleeve, and is inserted coaxially inside said hollow shaft through said adapter ring; and key means connecting the adapter ring angularly integral with the sleeve.

11. A device as claimed in claim 10, wherein said sleeve is locked axially and coaxially at the front to the adapter ring by at least one screw parallel to the hollow shaft.

* * * * *